US008312440B2

(12) United States Patent
Iwama et al.

(10) Patent No.: US 8,312,440 B2
(45) Date of Patent: Nov. 13, 2012

(54) METHOD, COMPUTER PROGRAM PRODUCT, AND HARDWARE PRODUCT FOR PROVIDING PROGRAM INDIVIDUALITY ANALYSIS FOR SOURCE CODE PROGRAMS

(75) Inventors: Futoshi Iwama, Yokohama (JP); Taiga Nakamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 12/194,092

(22) Filed: Aug. 19, 2008

(65) Prior Publication Data
US 2010/0050155 A1     Feb. 25, 2010

(51) Int. Cl.
*G06F 9/45* (2006.01)
(52) U.S. Cl. .............. 717/154; 717/120; 717/142
(58) Field of Classification Search ................ 717/120
See application file for complete search history.

(56) References Cited

U.S. PATENT DOCUMENTS

| | | | | |
|---|---|---|---|---|
| 5,293,629 | A * | 3/1994 | Conley et al. | 717/154 |
| 6,662,357 | B1 * | 12/2003 | Bowman-Amuah | 717/120 |
| 7,177,852 | B2 * | 2/2007 | Cui et al. | 706/46 |
| 7,530,060 | B1 * | 5/2009 | Fontenot et al. | 717/154 |
| 7,574,704 | B2 * | 8/2009 | Fulton et al. | 717/154 |
| 7,797,692 | B1 * | 9/2010 | Czajkowski | 717/161 |
| 7,917,900 | B2 * | 3/2011 | Rajamani et al. | 717/154 |
| 2003/0217023 | A1 * | 11/2003 | Cui et al. | 706/45 |
| 2006/0101441 | A1 * | 5/2006 | Fulton et al. | 717/158 |
| 2008/0104580 | A1 * | 5/2008 | Wilkinson | 717/142 |
| 2009/0158256 | A1 * | 6/2009 | Ponsford et al. | 717/120 |
| 2009/0300589 | A1 * | 12/2009 | Watters et al. | 717/142 |

OTHER PUBLICATIONS

Khoo Yit Phang, Mixing Type Checking and Symbolic Execution, ACM, 2010, 12 pages, <URL: http://delivery.acm.org/10.1145/1810000/1806645/p436-khoo.pdf>.*
Wolfgang Ecker, Impact of Description Language, Abstraction layer, and Value Representation on Simulation Performance, ACM, 2007, 6 pages, <URL: http://delivery.acm.org/10.1145/1270000/1266530/p767-ecker.pdf>.*
Stephen Edwards, Rethinking Computer Science Education from a Test-first Perspective, ACM, 2003, 8 pages, <URL: http://delivery.acm.org/10.1145/950000/949390/p148-edwards.pdf>.*
Zhu Zhou, A Novel Mechanism to Dynamically Switch Speed and Accuracy in SystemC Based Transaction Level Models, ACM, 2007, 4 pages, <URL: http://delivery.acm.org/10.1145/1540000/1531634/p405-zhou.pdf>.*

(Continued)

*Primary Examiner* — Thuy Dao
*Assistant Examiner* — Hua Lu
(74) *Attorney, Agent, or Firm* — Cantor Colburn LLP; Vazken Alexanian

(57) ABSTRACT

A source code of a program is used to identify a first portion of the program that is predicted as being written by a first developer wherein a remaining portion of the program is written by a second developer. The program includes a plurality of program elements. Style information is extracted from each of the program elements. The style information is analyzed to identify a first set of program elements which have a first style corresponding to the first developer, wherein the first style differs from a second style corresponding to the second developer and used by a second set of program elements comprising remaining program elements of the plurality of program elements, and wherein the style information identifies a pattern indicative of how one or more non-syntactic characters have been inserted among syntactic program elements of the plurality of program elements.

17 Claims, 12 Drawing Sheets

OTHER PUBLICATIONS

Luca Superiori, Performance of A H.264/AVC Error Detection Algorithm Based on Syntax Analysis, Google Scholar, 2006, 17 pages, <URL: http://publik.tuwien.ac.at/files/pub-et_12377.pdf>.*

Walter Bright, The D Programming Language, Google Scholar, 2004, 6 pages, <URL: http://www.itcj.edu.mx/alumnos/Feb2010/sistemas/The%20D%20Programming%20Language.pdf>.*

* cited by examiner

METHOD, COMPUTER PROGRAM PRODUCT, AND HARDWARE PRODUCT FOR PROVIDING PROGRAM INDIVIDUALITY ANALYSIS FOR SOURCE CODE PROGRAMS

BACKGROUND

This invention relates to the field of computing and, in particular, to methods, computer program products, and hardware products for providing program individuality analysis for source code programs.

Code review and inspection are techniques for identifying software defects (bugs) through manual examination of the source code. While these techniques are known to be effective in uncovering various defects which are difficult to detect by other means such as automated bug detection tools and testing tools, they are human-based approaches and, as such, are inherently labor-intensive processes. The amount of code developed in real software projects is often very large, which renders inspecting all of the code impractical. A solution to this problem is to locate, as a pre-process, which parts of the code are more likely to contain defects, and focus on inspecting those parts. Unfortunately, this has not been widely realized yet since there are few viable methods that can be used to automatically identify defect-prone parts in the source code.

It is known that miscommunication between developers is one of the most common causes of consistency errors. Thus, if certain code parts were written by multiple developers, it is reasonable to assume that these parts are more likely to be prone to consistency errors. Even if a code management system is employed to keep records of who edited each part of the source files, it is not unusual that code-reviewers often can only obtain access to the latest version of the source code (not the change history) due to restrictions inherent to the process in which an inspection is performed.

There are various existing tools for checking and correcting coding styles based on the viewpoint that a coding style should be standardized to improve source code quality. Illustrative examples of these tools include: (1) astyle (Artistic Style), http://sourceforge.net/projects/astyle/; (2) FxCop, http://www.gotdotnet.com /team/fxcop/; (3) Checkstyle, http://checkstyle.sourceforge.net/; (4) VB Law, http://www.visibleprogress.com/vb_law.htm; and (5) cxxchecker, https://gna.org/projects/cxxchecker/. These tools works by (a) defining or extracting the "correct" coding style convention for the target source code and (b) checking whether the code violates the correct style. The coding style convention mentioned above is actually a set of rules defining how each source code should be written. These conventional tools automatically process coding styles. However, conventional tools are not well adapted for certain settings, especially in situations where it is assumed that there is a "correct" coding style followed by a particular developer and not by others.

SUMMARY

A computer-executable method uses a source code of a program to automatically identify a first portion of the program that is predicted as being written by a first developer wherein a remaining portion of the program is written by a second developer, wherein the terms first and second are not used to denote any particular temporal sequence, and wherein the second developer represents a main programmer who wrote a majority of the program. The program includes a plurality of program elements. Style information is extracted from each of the program elements. The style information is analyzed to identify a first set of one or more program elements of the plurality of program elements which have a first style corresponding to the first developer. The first style differs from a second style corresponding to the second developer and used by a second set of program elements comprising remaining program elements of the plurality of program elements. The style information identifies a pattern indicative of how one or more non-syntactic characters comprising at least one of a blank, a tab, a line break, and a bracket, have been inserted among syntactic program elements of the plurality of program elements. The non-syntactic characters are then mapped to an abstract style representation. By computing a style anomaly as information entropy based on an occurrence ratio of an abstract pattern in the abstract style representation, program elements are identified which are written with the first style as being distinctive from the second style in which one or more remaining parts of the program are written.

Computer program products and hardware products corresponding to the above-summarized methods are also described and claimed herein. Other methods, hardware products, and/or computer program products according to embodiments will be or become apparent to one with skill in the art upon review of the following drawings and detailed description. It is intended that all such additional methods, hardware products, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The techniques disclosed herein enable detection of defect-prone code parts by identifying program locations which are likely to have been written by different developers. It should be noted that these techniques do not assume the existence of a code management system that keeps records of who edited each part of the source files, because there are still many software development projects that do not consistently manage source code using such a control system. Therefore, the techniques disclosed herein provide a means of detecting programs written by different programmers using source codes only. The techniques disclosed herein make use of differences in developers' coding styles. Unlike conventional approaches, the techniques disclosed herein do not generally assume that there is a "correct" coding style which is followed by a particular developer and not by others.

Figure 1:
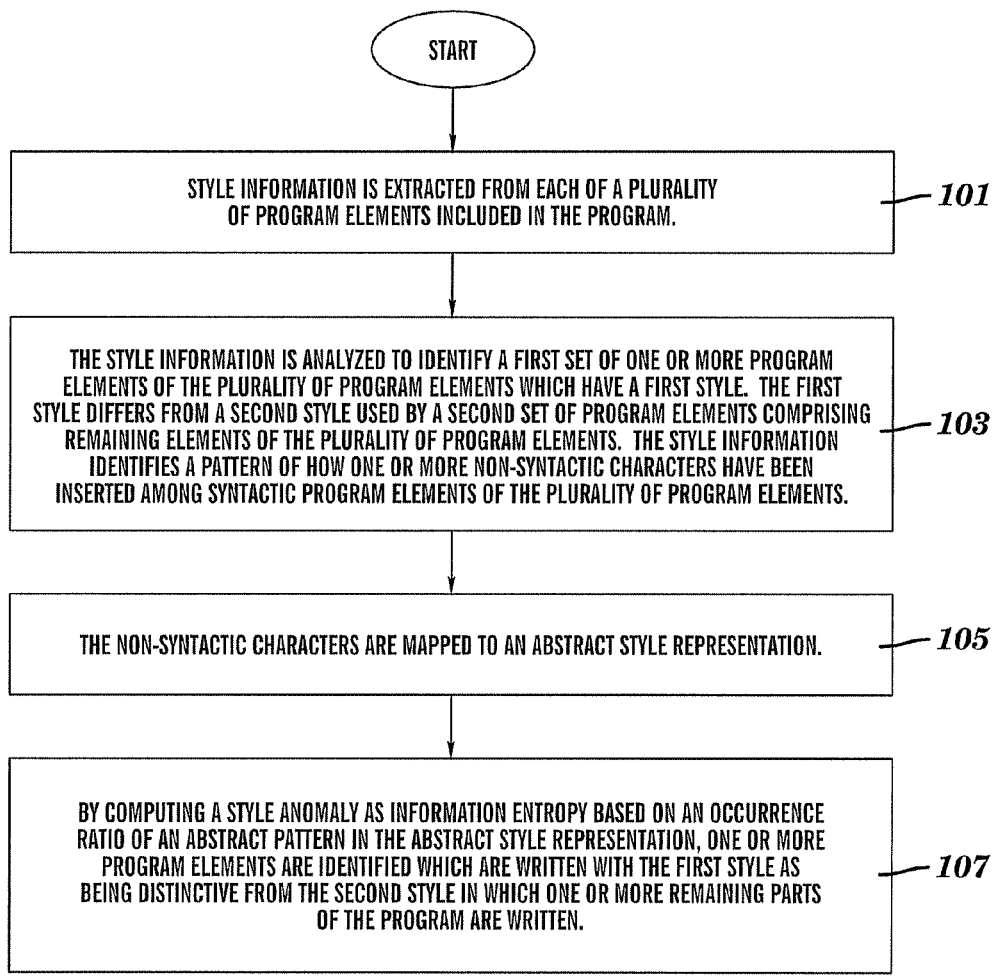
FIG. 1 is a flowchart setting forth a first illustrative computer-executable operational sequence for using a source code of a program to automatically identify a first portion of the program that is predicted to have been written by a first developer wherein a remaining portion of the program is written by a second developer.

FIG. 1 is a flowchart setting forth a first illustrative computer-executable operational sequence for using a source code of a program to automatically identify a first portion of the program that is predicted to have been written by a first developer wherein a remaining portion of the program is predicted to have been written by a second (or main) developer. The operational sequence of FIG. 1 commences at block 101 where style information is extracted from each of a plurality of program elements included in the program. Next, at block 103, the style information is analyzed to identify a first set of one or more program elements of the plurality of program elements which have a first style. The first style differs from a second style used by a second set of program elements comprising remaining elements of the plurality of program elements. The style information identifies a pattern of how one or more non-syntactic characters comprising at least one of a blank, a tab, a line break, and a bracket, have been inserted among syntactic program elements of the plurality of program elements.

The procedure progresses to block 105 where the non-syntactic characters are mapped to an abstract style representation. Then, at block 107, by computing a style anomaly as information entropy based on an occurrence ratio of an abstract pattern in the abstract style representation, one or more program elements are identified which are written with the first style as being distinctive from the second style in which one or more remaining parts of the program are written.

Blocks 103 and 105 may, but need not, be performed by defining coding styles as templates that represent how non-syntactic characters (blanks, tabs, line breaks, etc.) and brackets have been inserted among syntactic program elements of a target programming language. Alternatively or additionally, coding styles may be defined in terms of how these styles are mapped to abstract styles. Then, at block 205, each of a plurality of respective abstract styles for each of a plurality of corresponding elements may be obtained by applying the above templates. Accordingly, a style anomaly for an element may be computed as information entropy based on an occurrence rate for each of the plurality of respective abstract styles.

Figure 2:
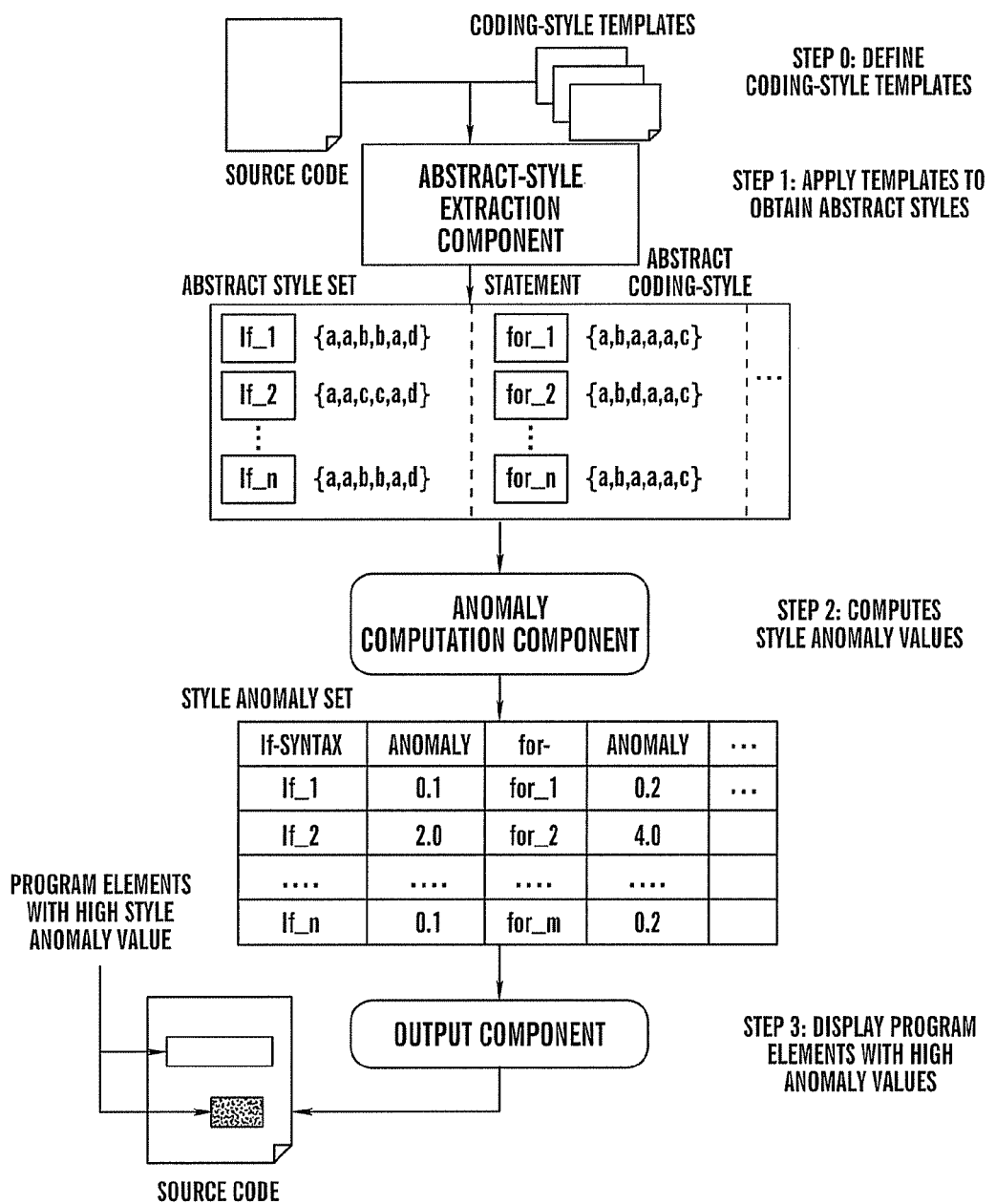
FIG. 2 is a flowchart setting forth a second illustrative computer-executable operational sequence for using a source code of a program to automatically identify a first portion of the program that is predicted to have been written by a first developer wherein a remaining portion of the program is written by a second developer.

FIG. 2 is s a flowchart setting forth a second illustrative computer-executable operational sequence for using a source code of a program to automatically identify a first portion of the program that is predicted to have been written by a first developer wherein a remaining portion of the program is predicted to have been written by a second developer. The operational sequence commences at Step 0 where coding style templates are defined. A coding style template is defined for each program element type defined in the syntax of the target programming language and mapping them to abstract styles. Next, at Step 1, templates are applied to obtain abstract styles. This step may, but need not, be performed by: (1) parsing the code to be analyzed and extracting program elements; and (2) computing an abstract coding style of each program element by applying a corresponding coding style template.

At Step 2, style anomaly values are computed. Step 2 may, but need not, be performed by computing a style anomaly value for each program element. The operational sequence progresses to Step 3 where one or more program elements with high anomaly values are detected. Step 3 may, but need not, be performed by (1) receiving style anomaly values for all program elements; and (2) optionally, highlighting one or more program elements having high anomaly values on a user interface.

Step 0 may, but need not, include one or more of the following sub-steps for defining the coding style template for each syntax element:

(a) Coding-Style Templates

A coding-style template is defined for each abstract-syntax of a target programming language. Once defined, one can use the same template set for all programs written in that programming language. Each coding-style template is illustratively defined with a target syntax element type, one or more style placeholders, and a style-abstraction function:

Target syntax element type: Each template is defined to be applicable to a particular type of program element defined in the syntax of the target programming language. Therefore, this information refers to the program element type for which the template is intended. For example, the target syntax element type information states that this template is applicable to the program-elements of an IF-STATEMENT element (if (E) S or if (E) {S}), where E and S are meta-variables representing an expression and a statement of programming language, respectively. Note that the source program is parsed into a tree representation called an Abstract Syntax Tree (AST), in which each tree node corresponds to a syntax element, and each template is applied to the AST nodes of the target element type. The AST representation is an existing technology.

Style placeholders: A style placeholder corresponds to a particular part of a code string in the target syntax element type, where coding-style may change. For example, a string between if and (E) in the IF-STATEMENT is mapped to one placeholder. Likewise, a string between (and E is mapped to another placeholder. The coding style of each program element is therefore described as a vector of style placeholders, and what string (including blanks, tabs, line breaks, brackets, etc.,) is written in each placeholder location.

Style-abstraction function: There are an infinite number of possible strings that can appear in each placeholder location. The method disclosed herein further abstracts the style representation by applying the style abstraction function. The function categorizes a string in each placeholder into discrete symbols by checking whether the string matches one of the patterns (regular expressions) defined for each placeholder.

TABLE 1 illustrates an exemplary template for an IF-THEN-ELSE-STATEMENT in the Java programming language:

strings for the placeholders of the template, and applying abstraction functions to obtain abstract style representations.

Matching coding-style templates and program elements: The matching is automatically performed by the following steps: First, by parsing the target source code, syntax of each program element is obtained. Then, matching an abstract syntax of coding-style template and a program element with the same syntax, the code string is extracted for each placeholder. Note that a normal code parser discards all non-syntactic information, so to obtain code strings for the placeholders it is necessary to map the location of the syntactic program element in the original source code. Finally, using the abstract function of the coding-style template, the string set extracted in previous step is converted to the abstract-style representation of the code element as a symbol series.

Examples of matching coding-style template and code element.

EXAMPLE 1 if (3!=2)
System.out.println("Trivial!")
else System.out.println("Are you OK?");

TABLE I

| Target syntax element type (AST node type) | Style placeholders: Each [i] is a placeholder | Definition of the abstraction function: (We use meta-variable s for possible values of each placeholder [i] and write s ="abc.." → n when the function maps value "abc ... " of s to symbol n. We also use meta-variables w,\t,\r\n,H as follows: w=white-space, \t=tab, \r\n=return, H = w or \t) . Symbols * and + are used in the same meaning as qualifiers defined for regular expressions: * indicates zero or more of the preceding element, and + indicates one or more of the preceding element. |
|---|---|---|
| if (E) then S1 else S2 | if [0] ( [1] E [2] ) [3] S1 [4] else [5] S2 [6] | For placeholders [0], [1], [2]: s = "" →a s =" w" →b s =" w+" →c otherwise →d For placeholders [3],[5]: s ="H*" →a s ="H*\r\nH*{" → h s ="{" →b s ="H*\r\nH*{H+" →i s ="{H+" →c s ="H*\r\nH*" →j s ="H+{" →d s ="H*\r\nH*{H*\r\nH*" →k s ="w+{w+"→e otherwise →l s ="{H*\r\nH*" →f s ="H+{H*\r\nH*" →g For placeholders [4],[6]: s =" H*" →a s =" H*\r\nH*" →f s =" }H*" →b s =" H*\r\nH*}H*" →g s =" H+}H*" →c s =" H*\r\nH*}H*\r\nH*" →h s =" }H*\r\nH*" →d otherwise →i s =" H+}H*\r\nH*" →e |
| ... | ... | ... |

Step 1 may, but need not, include one or more of the following sub-steps for applying templates to obtain abstract styles: receiving source codes and coding-style templates as inputs, analyzing syntax of the codes, deciding which coding-style template is to be applied to each program, extracting The result of extracting each string at placeholder is as follows (as is shown in the abstraction function defined in the above coding-style template, one may take into account the most outside "{" and "}" for each statement as the string to be extracted.)

[0]="w", [1]="w", [2]="ww", [3]="\r\n\t", [4]="\r\n", [5]="w", [6]="\r\n"

These strings are abstracted as follows by applying the abstraction function:

[0,1,2,3,4,5,6]=[b,b,c,j,f,a,f]

EXAMPLE 2

```
if (3=3) {
  System.out.println("Trivial");
} else {
  System.out.println("Are you OK?");
}
```

The result of extracting each string at the placeholder:
[0]="w", [1]=" ", [2]=" ", [3]="w{\r\n\t",
[4]="\r\n}w", [5]="w{\r\n\t", [6]="\r\n}\r\n"
The result of abstraction:
[0,1,2,3,4,5,6]=[b,a,a,g,g,g,h]

At Step 2 of FIG. 2, style anomaly values are computed. This step may be performed by receiving abstract coding styles for all (or for a plurality) of the program elements and then computing style-anomaly values for each of the elements. The style-anomaly value indicates how rare the style of each element is in the target source code.

Computation of Style-Anomaly Values:

A style-anomaly value expresses how rare the occurrence of a particular style of each program element is in the target source code. We compute the style-anomaly as information entropy based on an occurrence ratio of the abstract coding style for each program element type. Program elements with relatively high style-anomaly value are hence considered as the ones written by different developers. Style-anomaly value is defined with reference to Equation 1 (below) where the variables are defined as follows:

(G) denotes the number of occurrences of the program element type G in the target source code. Suppose that the coding-style templates for G has n placeholders, referred to as [0], . . . ,[n−1], and let #G[i](a) denote the number of program elements that have syntax G and symbol a at placeholder [i] in their abstract-style. Now, the style-anomaly value for a program element of the element type G having the abstract style $[a_0, \ldots, a_{n-1}]$ is defined as follows:

$$E[G](S)=(-\log_2(\#G[0](a_0)/\#(G))- \ldots -\log_2(\#G[n-1](a_{n-1})/\#(G)))$$ EQUATION 1

Here, #G[i](a)/#(G) expresses the occurrence ratio of abstraction symbol a at placeholder [i] and −log$_2$(#G[i](a)/#(G)) is the information entropy obtained by observing abstract symbol a. The style-anomaly value is given as a summation of the information entropy gained at each placeholder defined for the syntax.

An Example: Computation of Style-Anomaly Value:

Assume that target source codes include one if-statement (Stmt1) of the same form as the example1 and two (Stmt2, Stmt3) of the same form as the example 2. At this time, the style-anomaly value for each if-statement is computed as follows:

Abstract-style for each statement is firstly extracted as below:
Abstract style for Stmt1: [0,1,2,3,4,5,6]=[b,b,c,j,f,a,f]
Abstract style for Stml2: [0,1,2,3,4,5,6]=[b.a.a.g.g.g,h]
Abstract style for Stml3: [0,1,2,3,4,5,6]=[b.a.a.g.g.g,h]
Let us consider abstract symbols at placeholder [1] of these three statements. Symbol b of placeholder [1] occurs once in three occurrence of the statement with If-then-else syntax. Hence the occurrence ratio of the symbol b is 1/3. Using the ratio, the anomaly-value of Stmt1 at placeholder [1] is given by Equation 2 as follows:

$$-\log 2(1/3)$$ EQUATION 2

The whole style-anomaly value is defined above as the summation of the anomaly-values of placeholders [0], . . . ,[5]. So, we obtain Style-anomaly value for Stmt1=−log 2(1/1)−log 2(1/3)−log 2(1/3)−log 2(1/3)−log 2(1/3)−lot 2(1/3)−log2 Style-anomaly value for Stml2=−log2 (1/1)−log2(2/3)−log2(2/3)−log2(2/3)−log2(2/3)−lot2(2/3)−log2(2/3)=3.51 can be calculated. As a result, in this example, the style-anomaly value of Stml1 is higher than that of Stmt.

At Step 3 of FIG. 2, one or more program elements with high style-anomaly values are displayed. First, the style-anomaly value for each program element is received and then program-elements with high anomaly values are displayed. As a result of the previous steps each program element in the target source code is assigned a style anomaly value. The more distinctive the style of the program element relative to other elements of the same type, the greater the style anomaly value is. Therefore, the method sorts the style anomaly values in a descending order and displays elements with high anomaly values. We can either display a fixed number of program elements, or, we can assume a constant threshold for the style-anomaly value and display all program-elements that have style-anomaly greater than the threshold.

Step 3 may, but need not, be performed using any of the following graphical user interface (GUI) mechanisms: Command Line, File Manager, or Source Code Editor. With respect to Command Line, the methods described in connection with any of FIG. 1 or 2 may be implemented as a program executed from the command line. That is, given file names as arguments, the program can perform the individuality-analysis for each file and output the result. File manager refers to utilization of a program that is integrated with a file manager (the software that can display the list of files in a directory, package, etc, ). In this implementation, the analysis is performed on the files selected on a file manager GUI. Programs based on any of the methods described herein with reference to FIG. 1 or 2 may also integrated into a source code editor. In this case, the editor is improved by adding a function for performing the individuality analysis which may be executed when a button on the GUI is pushed. The improved editor can analyze a program displayed on it and highlight program-elements with high style-anomaly value (the program elements are predicted to be written by other programmers (such as a first programmer) rather than a main programmer (such as a second programmer).

The methods described in conjunction with FIGS. 1 and 2 provide several technical effects. First, the methods enable detection of program elements or code-files that are likely to be written by different programmers using the characteristics of coding styles. The analysis can be performed automatically using only the source code. By using any of the described methods as a pre-process of manual code reviews and inspections, human inspectors can predict which code parts are more likely to be prone to consistency defects and improve the efficiency of manual inspection by prioritizing the focus especially when the target software consists of a large amount of source code.

Next, some illustrative experimental results are presented. These results include the application of any of the methods described in conjunction with FIGS. 1 and 2 to real data in order to demonstrate how effective these methods will be. One hypothetical drawback of the described methods is that, if all developers follow the same coding styles (through a standardization process), it is possible that the differences may not be detectable at all. However, the experimental results show that there were a lot of differences in coding styles observed in the source codes of real software projects, and the methods of FIGS. 1 and 2 could successfully detect them as style anomaly values.

For purposes of the experimental results, a false-positive ratio was defined as the probability that the analysis gives a higher anomaly value to the program elements written by the "main" programmer who wrote most part of a whole program. In connection with the description of FIG. 1, this main programmer was referred to as the second programmer. For program elements with ten highest style anomaly values, the false positive has ranged from 20 percent to 60 percent. Detection performance depends on the variability in coding styles between developers and the fluctuation of each developer's coding style. The more stable each developer's coding style is, the higher the performance of detecting style anomalies using the methods described herein.

In the experiment, information regarding which programmer had written each line of source code was obtained. We used the "annotate" function of Subversion and CVS to obtain the information on the name of last updater for each line of the source code and assumed the updater as the programmer who wrote the line. Strictly speaking, because only a part of code of each line may be edited, all the codes of the line might not be written by the updater. We did not consider this error factor in the experiment.

Table 2 (below) presents a summary of open-source projects that were used in the experiment. All the software in the projects is implemented using Java™ programming language.

TABLE 2

| Software | Repository URL | Num of files | num of lines (approx) |
|---|---|---|---|
| FreeCol | https://freecol.svn.sourceforge.net/svnroot/freecol/freecol/trunk/src/net/sf/freecol/server/control/ | 374 | 236000 |
| DrJava | https://drjava.svn.sourceforge.net/svnroot/drjava/trunk/drjava/ | 1,080 | 248000 |
| Jmol | https://jmol.svn.sourceforge.net/svnroot/jmol/trunk/Jmol/ | 418 | 143000 |

As an example, we show an output of the "svn annotate" command. For each line of the code, the final change revision (which we don't use), the last updater's name and the code content are displayed.

TABLE 3

| | | |
|---|---|---|
| 783 | stiangre | package net.sf.freecol.server.control; |
| 783 | stiangre | |
| 1089 | stiangre | import java.io.IOException; |
| 2927 | burschik | import java.util.ArrayList; |
| 3398 | burschik | import java.util.EnumMap; |
| 783 | stiangre | import java.util.Iterator; |
| 2927 | burschik | import java.util.List; |
| 2075 | erik_bergersjo | import java.util.logging.Level; |
| 1089 | stiangre | import java.util.logging.Logger; |
| 2891 | burschik | |
| 2878 | sergiocambra | import net.sf.freecol.FreeCol; |
| 3442 | burschik | import net.sf.freecol.common.model.AbstractUnit; |
| 2156 | stiangre | import net.sf.freecol.common.model.Colony; |

An analysis for the following four kinds of statements of the Java™ programming language has been implemented based on the methods described herein with reference to FIGS. 1 and 2: (a) "if" statement; (b) "if-then" statement with "then" block having code of only one line; (c) "if-then" statement with "then" block having code of several lines; (d) "if-then-else" statement with "then" and "else" blocks, which have code of only one line; (e) "if-then-else" statement with "then" and "else" blocks, which have code of several lines; (f)"while" statement; (g)"for" statement; and (h) "assignment" statement. Now, the foregoing statements are called target statements. These statements are selected from the viewpoint that the coding-style of each programmer may vary greatly from programmer to programmer.

Although the analysis can be applied to other kinds of statements and expressions, we show the experimental result of the analysis against the four kinds of statements provided above for purposes of illustration only. We also distinguish if-statements by whether the if-statement has body-statements of one line or several lines because it is likely that the coding-style of if-statement depends on the number of lines of its body-statements. We performed the analysis to all source code files in each project and gained results. In the experiment, we computed the style-anomaly value by the file. That is, we took into account statements in each file to compute the style-anomaly value. (Hence, in the case that there is one if-statement in a file, the style-anomaly value of the statement in the file is zero.)

With regard to the foregoing example, data of the target projects was preprocessed as follows:

(i) Compute a style-anomaly value by applying an analysis based on any of the methods described previously in conjunction with FIG. 1 or 2;

(ii) Extract each start line of a target statement and consider the last updater of the line as the one of the target statement that begins at the line. The information on the last updater of each line is obtained by the above-mentioned "svn- or csv-annotate" command.

Note that each statement may include several lines of code and hence there may be several updaters of the each target statement. However, we approximated the updater of the target statement by one of the first line of the target statement. For example, we may obtain information as shown in Table 4 (below):

TABLE 4

| Line number | Last Updater | Style-anomaly value |
|---|---|---|
| 136 | burschik | 0.0 |
| 139 | burschik | 0.0 |
| 146 | stiangre | 0.3219280948873623 |
| 147 | stiangre | 0.0 |
| 149 | stiangre | 0.1926450779423959 |
| ... | ... | ... |

(iii) Extract the following information for each file: (a) how many programmers or updaters wrote target statements in the file?; (b) who is the programmer who wrote the majority of code of the file? (we will call this programmer the major programmer of each file); (d) what percentage of the whole code in the file did the major programmer write? (we will call this percentage the major-ratio); and: (e) was the main programmer the last updater of each target statement? The foregoing information is illustrated in Table 5 (below):

TABLE 5

| Start-line Num of Target statement | File Name | Style anomaly value | Num Of Updaters | Major ratio | Did the main programmer write? (0 = false/1 = true) |
|---|---|---|---|---|---|
| 136 | FreeCol.java | 0.0 | 5 | 0.78431372549 | 0 |
| 139 | FreeCol.java | 0.0 | 5 | 0.78431372549 | 0 |
| ... | ... | ... | ... | ... | ... |

(iv) Obtain the information mentioned at (iii) from all source code files and sort the results according to descending order of style-anomaly value.

The analysis based on any of the methods discussed in connection with FIGS. 1 and 2 computes a respective style-anomaly value for a corresponding target statement. This value indicates how different the coding style of each target statement is from other parts of code. So, to evaluate the performance of the analysis, we have to decide on a set of criteria to determine whether the style-anomaly values are really qualified.

Basic criterion: The most basic question for the performance will be the "Can we detect a difference in coding-style between programmers/developers?". That is, the question says that the difference in the coding-style may be concealed because of deciding to enforce a coding-style convention or using an automatic style adjusting function in editors. Hence, the first and most basic criterion is whether the analysis can detect the difference in coding-style of source codes developed in real software development projects.

Criterion based on the relation between major programmer and style-anomaly value: To evaluate each output result, we have to define the program-element that is written by programmers other than the main programmer. Let us consider, for example, a code file written by only a single programmer. From the file, we cannot find any program-element written by anyone other than main programmer. Conversely, if we consider a file edited by a lot of developers, almost every program-element may be an element written by a programmer other than main programmer.

Thus, for the purpose of evaluation, we use the criterion of whether or not a major programmer wrote program elements that have the highest or higher style-anomaly value. For example, let us consider the case that we obtain the result of the analysis for a file and select the highest 10 target statements of the file in order of style-anomaly value. If the result indicates 4 statements among them were written by the major programmer, then the false positive ratio is 4/10 on this criterion. We will call this type of false positive ratio the majority-ratio hereafter.

Note that the false negative ratio is not adequate for evaluation of the performance of the analysis because it cannot be believed that each programmer always uses different coding-styles for all code. That is, the analysis is not expected to detect every program-element written by no-major programmers and hence we do not use the false negative ratio as the criterion.

Criterion based on the relation between number of updaters of each file and style-anomaly value: Generally, there are fluctuations not only in the coding-style between different developers but in the style of one developer. Considering the purpose of the invention of detecting inconsistencies between different developers, style-anomaly value of each target statement is to be higher in code-files written by many programmers than in ones written by one programmer.

Results—Basic Criterion: From the result as follows, it is obvious that there are actually coding-style differences in source codes of real projects and these can be detected, although the range of fluctuations in coding-style may be changed according to developer's skill and quality of the project management.

Criterion on the relation between major programmer and style-anomaly value: As follows, we show the number of target statements and majority-ratio against highest ten style-anomaly values (i.e. the majority-ratio describes the percentage of target statements written by the major programmer among the statements with top ten highest style-anomaly values).

TABLE 6

| Software | Num of target statements | The majority ratio against top 10 statements |
|---|---|---|
| FreeCol | 10,579 | 0.2 |
| DrJava | 16,288 | 0.3 |
| Jmol | 26,706 | 0.6 |

As seen in Table 6, the analysis may detect program-elements that were written by no-major programmers by selecting statements with high style anomaly values.

Figure 3:
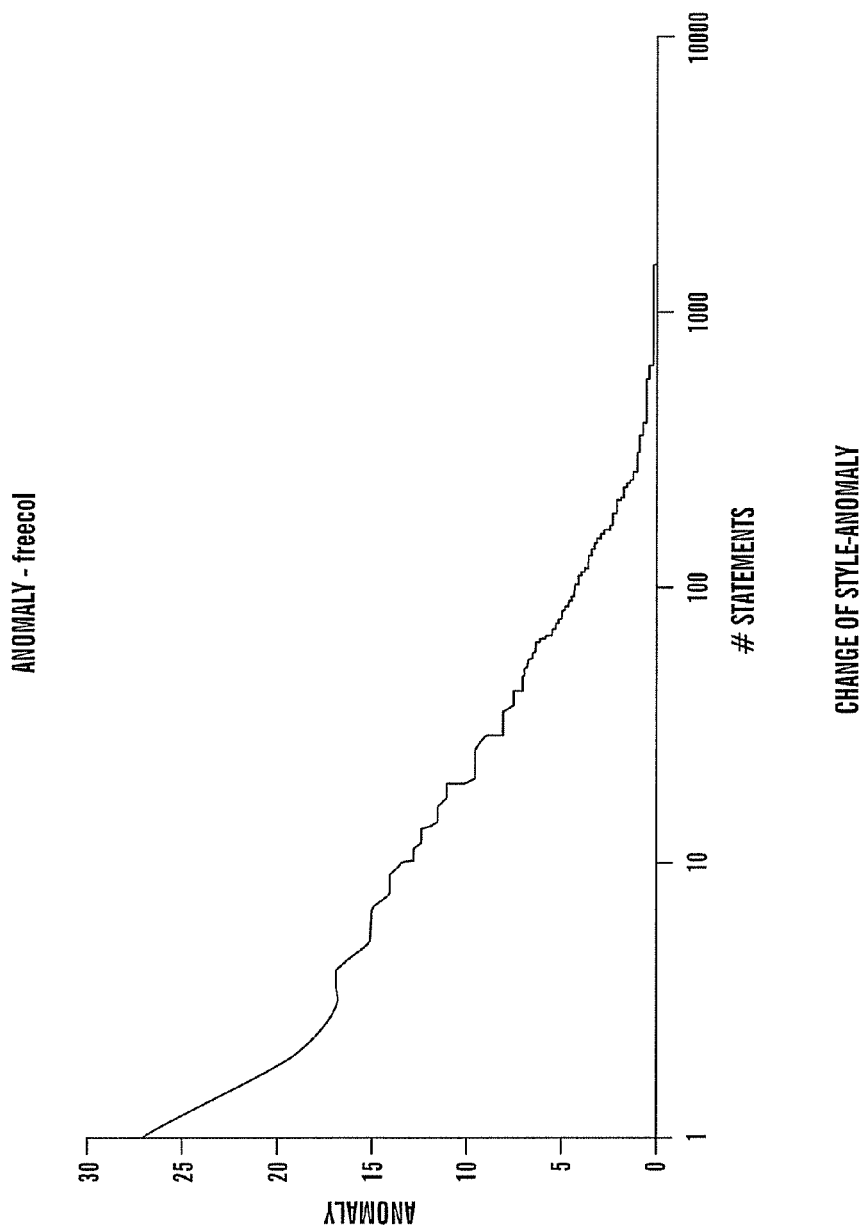
FIG. 3 is a graph indicating changes in style-anomaly value versus number of program elements for a first illustrative software source code project.
Figure 4:
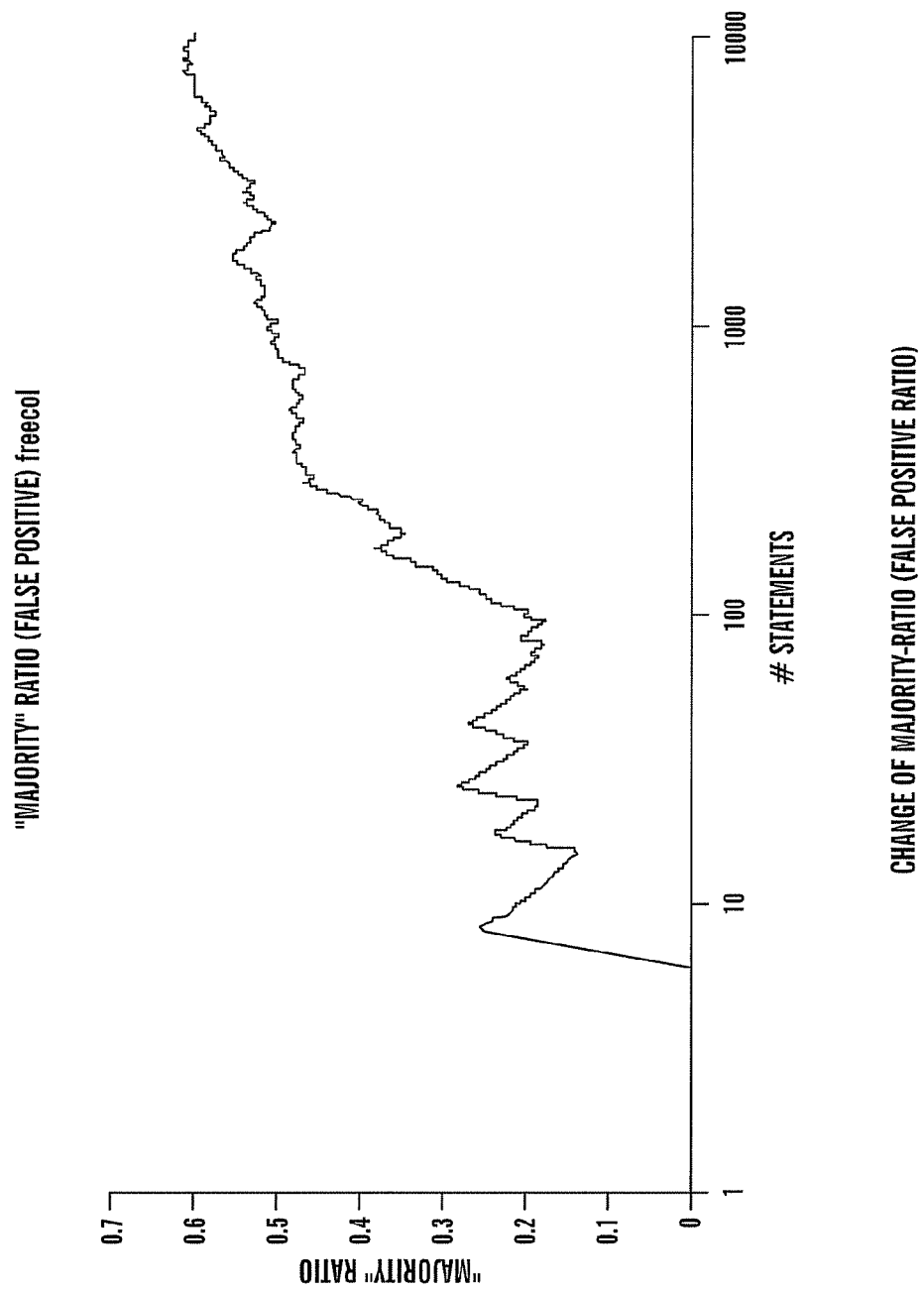
FIG. 4 is a graph indicating changes in majority ratio versus number of program elements for the first illustrative software source code project.

FIGS. 3-6 summarize the results obtained from the software projects named FreeCol, DrJava, and Jmol. FIG. 3 is graph indicating changes in style-anomaly value versus number of program elements (number of statements) for the FreeCol software project wherein the anomaly values are sorted in descending order of high style-anomaly value. FIG. 4 is a graph indicating changes in majority ratio versus program elements (number of statements) for the FreeCol software project. The data for FIG. 4 were sorted in order of high to low style-anomaly values and a test was performed to indicate whether or not each program element was written by a main (or major) programmer.

Figure 5:
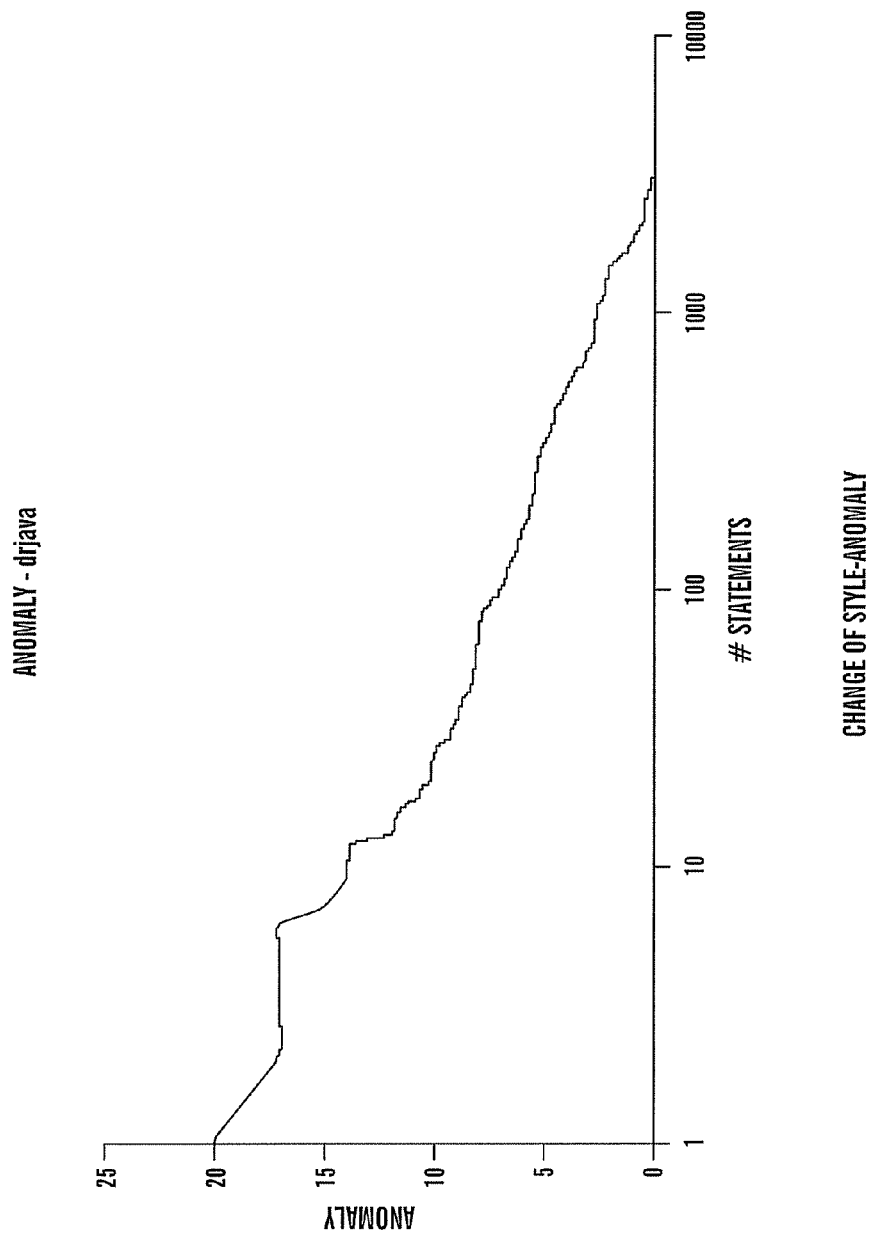
FIG. 5 is a graph indicating changes in style-anomaly value versus number of program elements for a second illustrative software source code project.
Figure 6:
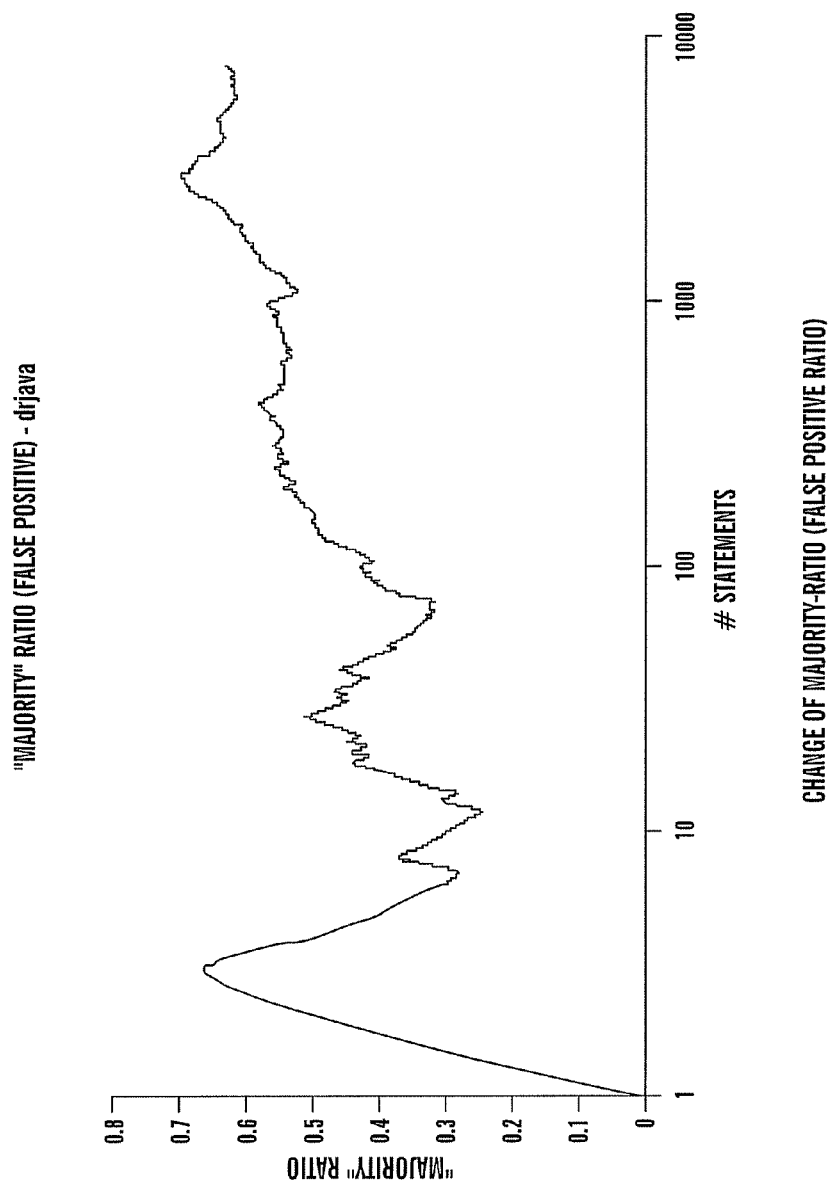
FIG. 6 is a graph indicating changes in majority ratio versus number of program elements for the second illustrative software source code project.

FIG. 5 is graph indicating changes in style-anomaly value versus number of program elements (number of statements) for the DrJava software project wherein the anomaly values are sorted in descending order of high style-anomaly value. FIG. 6 is a graph indicating changes in majority ratio versus program elements (number of statements) for the DrJava software project. The data for FIG. 6 were sorted in order of high to low style-anomaly values and a test was performed to indicate whether or not each program element was written by a main (or major) programmer.

Figure 7:
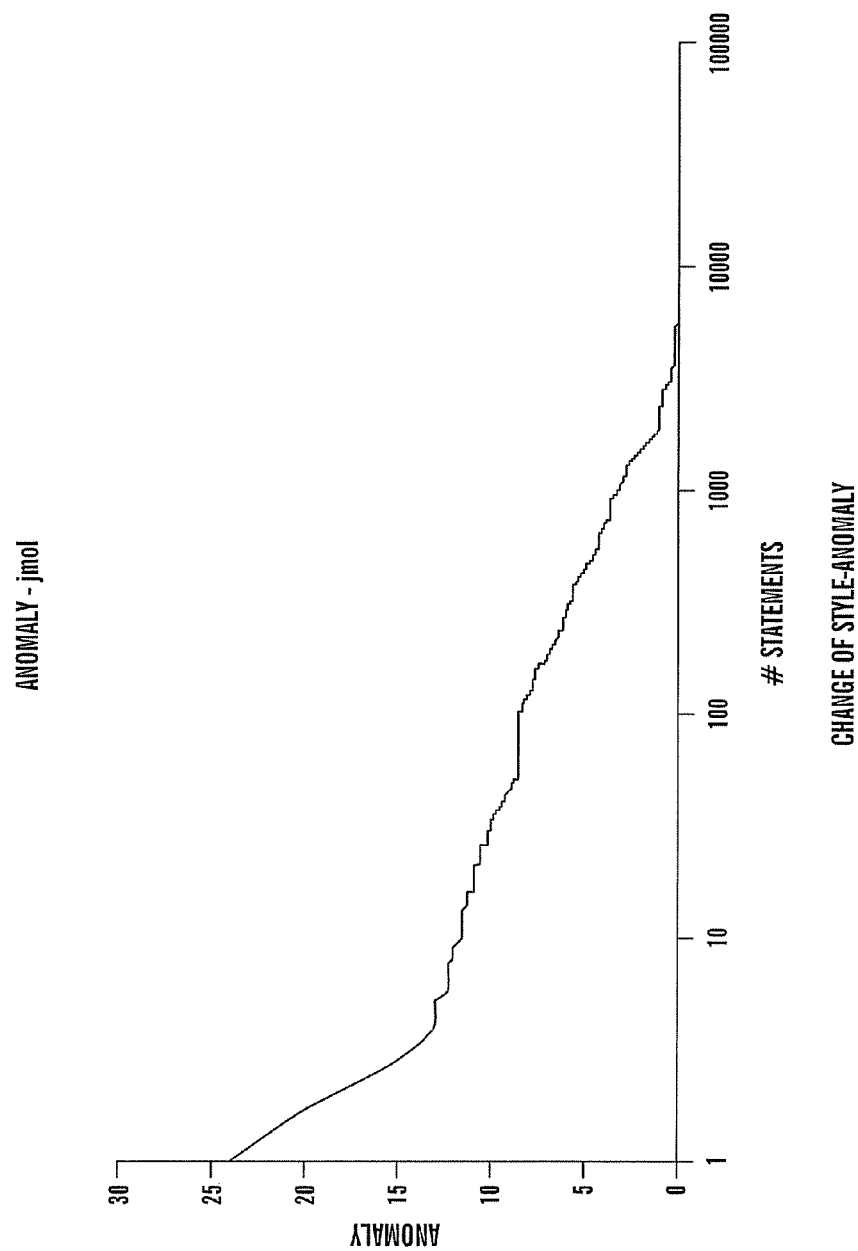
FIG. 7 is a graph indicating changes in style-anomaly value versus number of program elements for a third illustrative software source code project.
Figure 8:
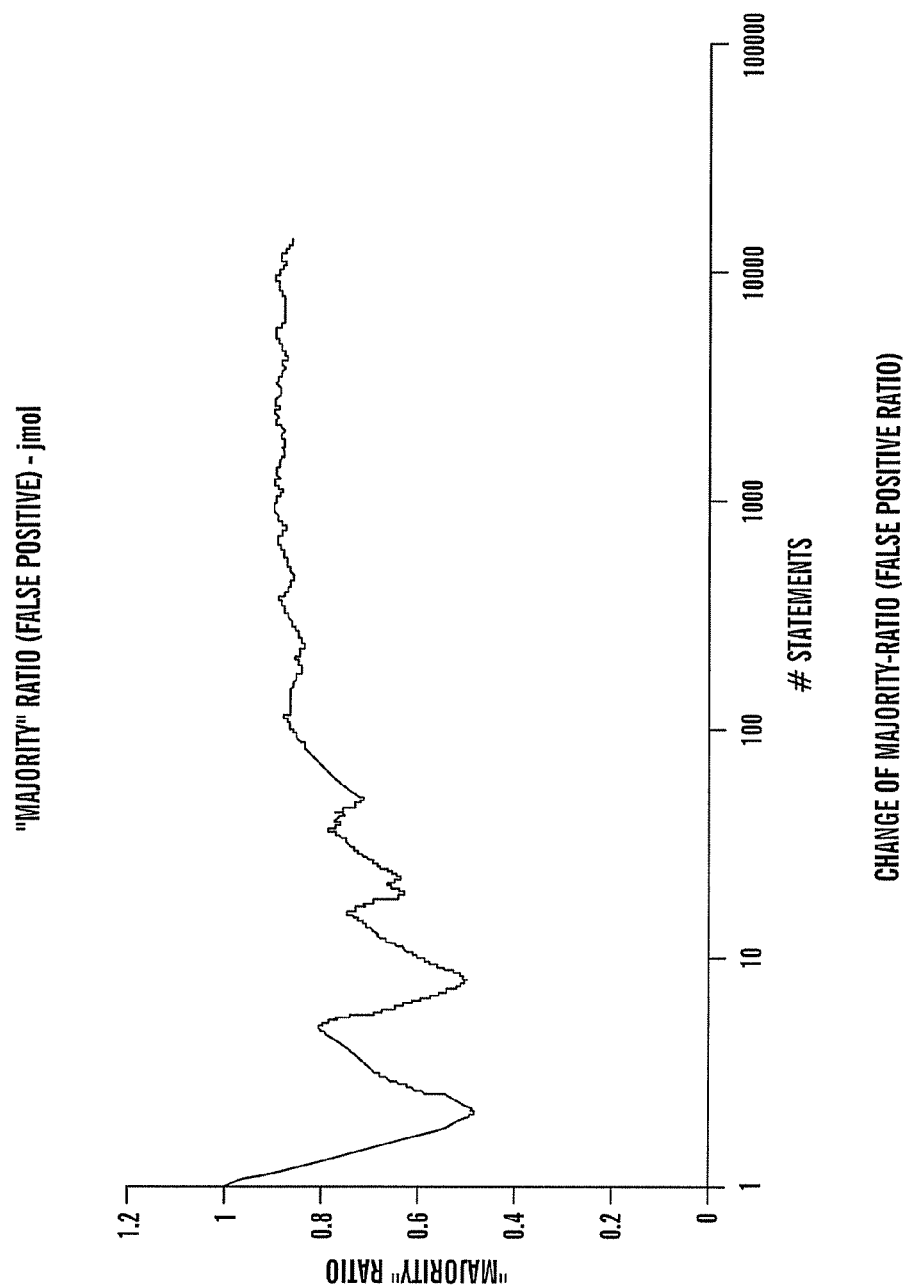
FIG. 8 is a graph indicating changes in majority ratio versus number of program elements for the third illustrative software source code project.

FIG. 7 is graph indicating changes in style-anomaly value versus number of program elements (number of statements) for the Jmol software project wherein the anomaly values are sorted in descending order of high style-anomaly value. FIG. 8 is a graph indicating changes in majority ratio versus program elements (number of statements) for the Jmol software project. The data for FIG. 8 were sorted in order of high to low style-anomaly values and a test was performed to indicate whether or not each program element was written by a main (or major) programmer.

Comparing the results obtained from various projects, in the Jmol project, the performance was the worst. From the results, we can barely distinguish program-elements that were written by no major programmers from those written by the major programmer. Note that the terms "major programmer", "main programmer", "main developer", and "major developer" as used herein are interchangeable. The reason for the Jmol result seems to be that the fluctuation in each developer's coding style is very large for the source codes of the project. The best results were obtained in the Freecol project, where the majority ratio is zero against the top seven anomaly elements.

Note that the majority-ratio is a less meaningful measure for files that have low major-ratio (i.e. ratio of code that major programmer writes) because distinguishing one programmer from others is more difficult to justify. Therefore we present the majority ratio as a criterion since no better alternatives are known.

Figure 9:
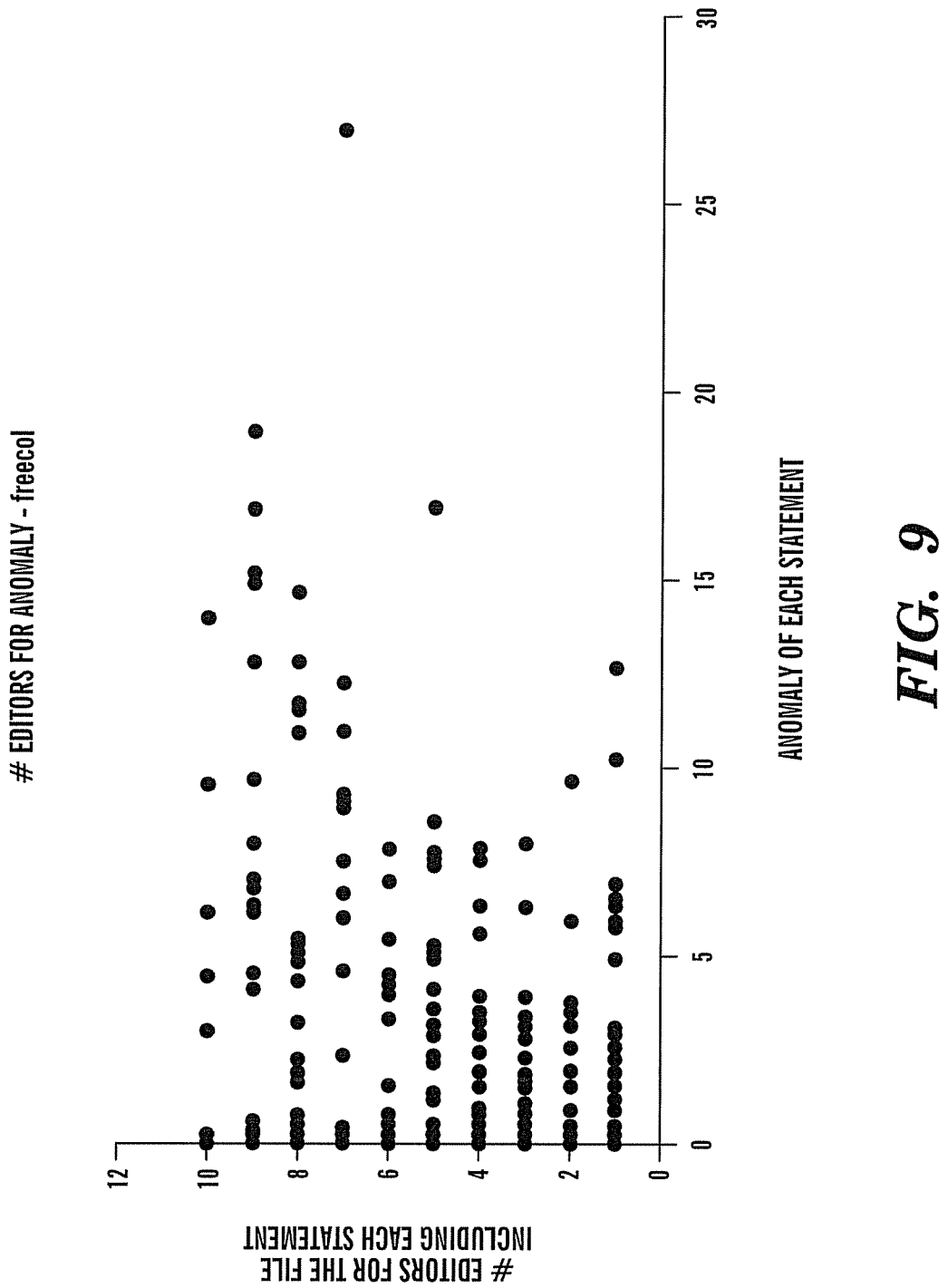
FIG. 9 is a graph showing a number or quantity of updaters of a source code file versus the style anomaly of each statement in the file for the first illustrative software source code project.
Figure 10:
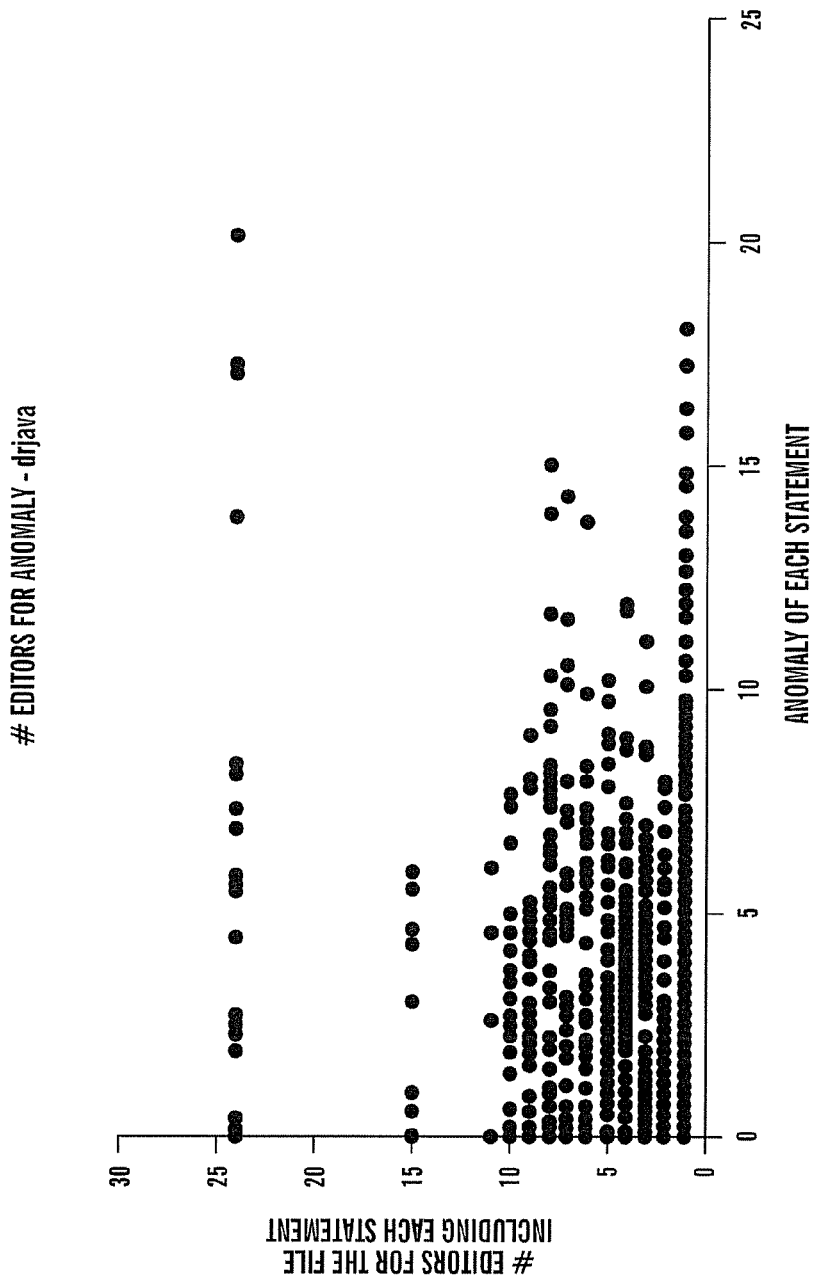
FIG. 10 is a graph showing a number or quantity of updaters of a source code file versus the style anomaly of each statement in the file for the second illustrative software source code project.
Figure 11:
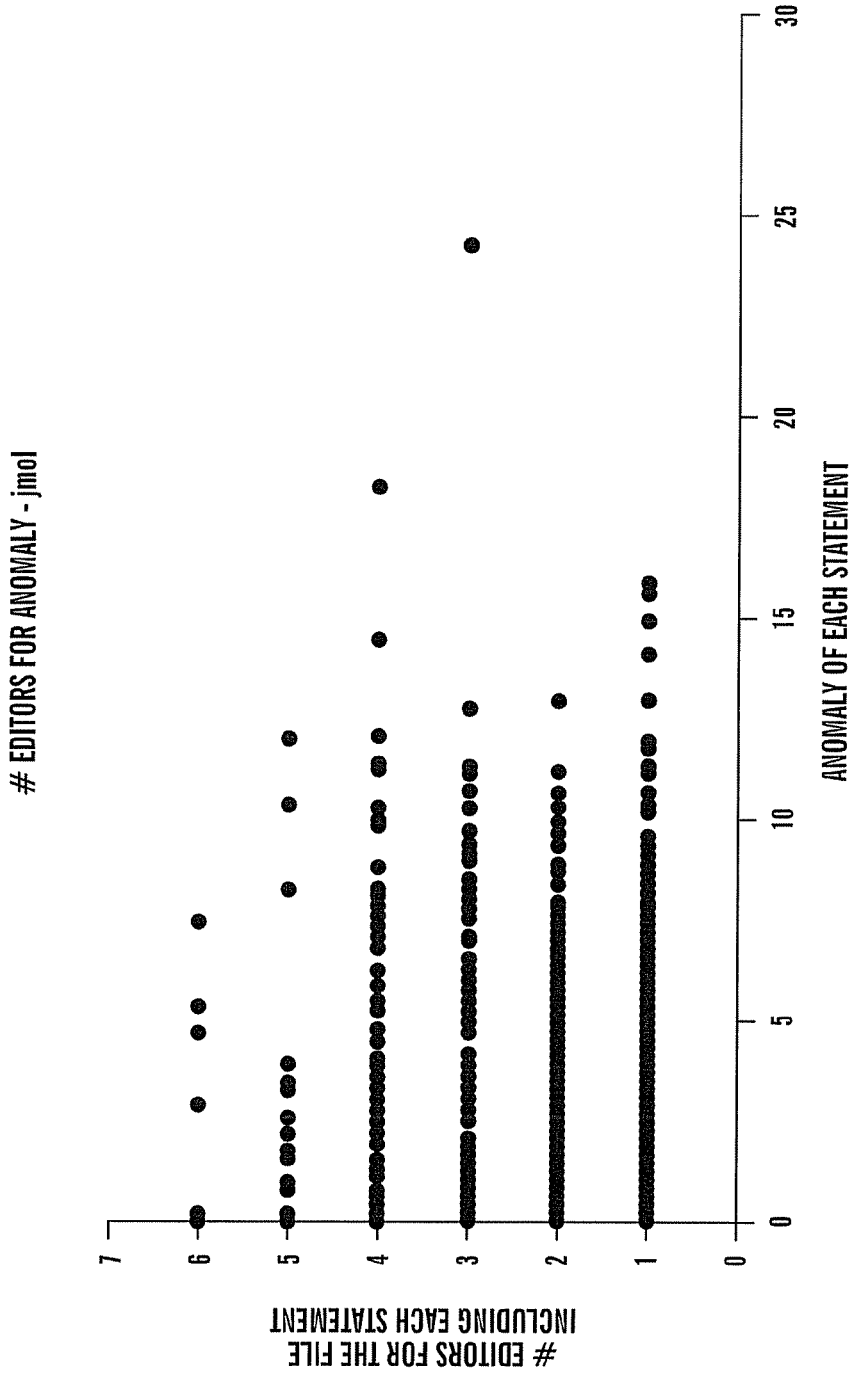
FIG. 11 is a graph showing a number or quantity of updaters of a source code file versus the style anomaly of each statement in the file for the third illustrative software source code project.

Criterion on the relation between number of updaters of each file and style-anomaly value: As described previously, the performance of the methods disclosed herein may differ from project to project. To interpret this further, we plotted every target statement in each project on the graph where the vertical axis indicates the number of updaters of the file including the element and the horizontal axis indicates style-anomaly. Thus, FIG. 9 is a graph showing a number (or quantity) of updaters (or editors) of a source code file versus the style anomaly of each statement in the file for the FreeCol software source code project. Similarly, FIG. 10 is a graph showing a number (or quantity) of updaters (or editors) of a source code file versus the style anomaly of each statement in the file for the DrJava software source code project. Additionally, FIG. 11 is a graph showing a number (or quantity) of updaters (or editors) of a source code file versus the style anomaly of each statement in the file for the Jmol software source code project. Examining FIGS. 9-11, the result from the Freecol project showed the best performance; the fluctuation in coding-style of the code written by one programmer is distributed more narrowly than one written by many programmers. At the same time, in projects with bad performance, both of the coding-style distributed widely and hence we cannot separate the two cases.

In the foregoing experiment, we used data from open-source projects to evaluate the results of the analysis and showed the analysis is feasible and effective as a pre-process to manual code inspection. For the purpose of evaluation, we distinguished a "major" programmer form other programmers and assumed the criterion that program-elements written by the other programmers should have higher style-anomaly values.

Figure 12:
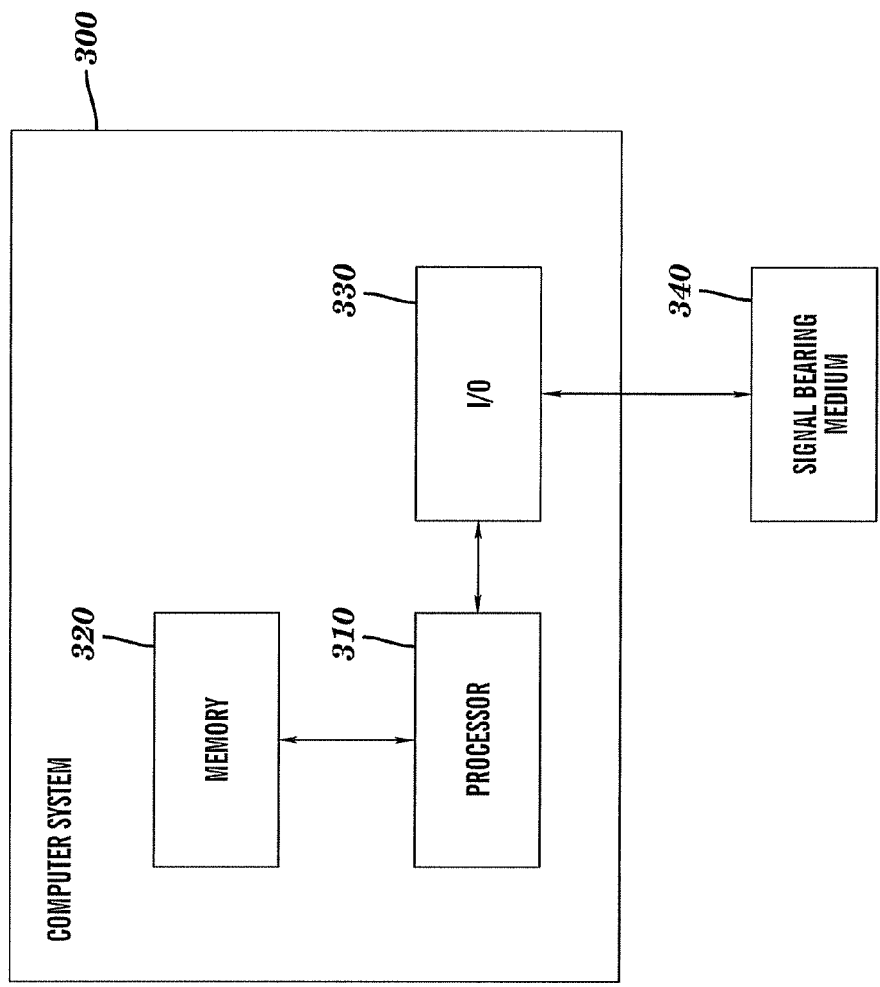
FIG. 12 is a block diagram setting forth an illustrative computer program product or hardware product for using a source code of a program to automatically identify a first portion of the program that is predicted to have been written by a first developer wherein a remaining portion of the program is predicted to have been written by a second developer.

FIG. 12 is a block diagram setting forth an illustrative computer program product or hardware product for using a source code of a program to automatically identify a first portion of the program that is predicted to have been written by a first developer wherein a remaining portion of the program is predicted to have been written by a second developer. The system includes a computer 300 operatively coupled to a signal bearing medium 340 via an input/output interface (I/O) 330. The signal bearing medium 340 may include a representation of instructions for using a source code of a program to automatically identify a first portion of the program that is predicted to have been written by a first developer wherein a remaining portion of the program is predicted to have been written by a second developer, and may be implemented as, e.g., information permanently stored on non-writeable storage media (e.g., read-only memory devices within a computer, such as CD-ROM disks readable by a CD-ROM drive), alterable information stored on a writeable storage media (e.g., floppy disks within a diskette drive or hard disk drive), information conveyed to a computer by a communications medium, such as through a computer or telephone network, including wireless or broadband communications networks, such as the Internet, etc.

The computer 300 includes a processor 310 that processes information for using a source code of a program to automatically identify a first portion of the program that is predicted to have been written by a first developer wherein a remaining portion of the program is predicted to have been written by a second developer, wherein the information is represented, e.g., on the signal bearing medium 340 and communicated to the computer 300 via the I/O 330, wherein the processor 310 saves information as appropriate into a memory 320. This information may also be saved into the memory 320, e.g., via communication with the I/O 330 and the signal bearing medium 340.

The processor 310 executes a first program comprising instructions for using a source code of a second program to automatically identify a first portion of the second program that is predicted to have been written by a first developer wherein a remaining portion of the second program is predicted to have been written by a second developer. The second program includes a plurality of program elements. Style information is extracted from each of the program elements. The style information is analyzed to identify a first set of one or more program elements of the plurality of program elements which have a first style corresponding to the first developer. The first style differs from a second style corresponding to the second developer and used by a second set of program elements comprising remaining program elements of the plurality of program elements. The style information identifies a pattern indicative of how one or more non-syntactic characters comprising at least one of a blank, a tab, a line break, and a bracket, have been inserted among syntactic program elements of the plurality of program elements. The non-syntactic characters are then mapped to an abstract style representation. By computing a style anomaly as information entropy based on an occurrence ratio of an abstract pattern in the abstract style representation, program elements are identified which are written with the first style as being distinctive from the second style in which one or more remaining parts of the second program are written. The foregoing steps may be implemented as a program or sequence of instructions within the memory 320, or on a signal bearing medium, such as the medium 340, and executed by the processor 310.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-executable method for using a source code of a program to automatically identify a first portion of the program that is predicted as being written by a first developer wherein a remaining portion of the program is written by a second developer the method comprising:
   extracting coding style information from a plurality of program elements, the coding style information identifying a pattern indicative of how one or more non-syntactic characters have been inserted among syntactic program elements of the plurality of program elements;
   defining a plurality of code style templates;
   generating abstract coding style representation for each of the plurality of code style templates;
   mapping the non-syntactic characters to an abstract coding style representation; and
   computing a coding style anomaly value as information entropy, the coding style anomaly value determined by matching the one or more program elements to abstract code representation, the coding style anomaly value indicating how rare the occurrence of a particular style of each program element is in the target source code;
   wherein the coding style anomaly value is used to identify one or more program elements which are written with the first coding style as being distinctive from one or more program elements which are written in the second coding style.

2. The method of claim 1 wherein the one or more non-syntactic characters comprise at least one of a blank, a tab, a line break, and a bracket, and wherein the one or more non-syntactic characters have been inserted among syntactic program elements of the plurality of program elements.

3. The method of claim 1 further including defining a coding style template for each of a plurality of program element types defined in a syntax of a target programming language corresponding to the program, and mapping each of the program elements to a corresponding abstract coding style.

4. The method of claim 3 wherein each coding style template is defined with a target syntax element type, one or more coding style placeholders, and a coding style-abstraction function.

5. The method of claim 4 further comprising applying at least one template to the source code of the program to obtain one or more abstract coding styles.

6. The method of claim 5 further comprising: (1) parsing the source code and extracting program elements; and (2) computing an abstract coding style of each program element by applying a corresponding coding style template.

7. A computer program product comprising a storage medium readable by a processing circuit and storing instructions for execution by the processing circuit for facilitating a method for using a source code of a program to automatically identify a first portion of the program that is predicted as being written by a first developer wherein a remaining portion of the program is written by a second developer the method comprising:
   extracting coding style information from a plurality of program elements, the coding style information identifying a pattern indicative of how one or more non-syntactic characters have been inserted among syntactic program elements of the plurality of program elements;
   defining a plurality of code style templates;
   generating abstract coding style representation for each of the plurality of code style templates;
   mapping the non-syntactic characters to an abstract coding style representation; and
   computing a coding style anomaly value as information entropy, the coding style anomaly value determined by matching the one or more program elements to abstract code representation, the coding style anomaly value indicating how rare the occurrence of a particular style of each program element is in the target source code;
   wherein the coding style anomaly value is used to identify one or more program elements which are written with the first coding style as being distinctive from the second coding style.

8. The computer program product of claim 7 wherein the one or more non-syntactic characters comprise at least one of a blank, a tab, a line break, and a bracket, and wherein the one or more non-syntactic characters have been inserted among syntactic program elements of the plurality of program elements.

9. The computer program product of claim 7 further including defining a coding style template for each of a plurality of program element types defined in a syntax of a target programming language corresponding to the program, and mapping each of the program elements to a corresponding abstract coding style.

10. The computer program product of claim 9 wherein each coding style template is defined with a target syntax element type, one or more coding style placeholders, and a coding style-abstraction function.

11. The computer program product of claim 10 further comprising applying at least one template to the source code of the program to obtain one or more abstract coding styles.

12. The computer program product of claim 11 further comprising:
(1) parsing the source code and extracting program elements; and (2) computing an abstract coding style of each program element by applying a corresponding coding style template.

13. A hardware product comprising a storage medium readable by a processing circuit and storing instructions for execution by the processing circuit for facilitating a method for using a source code of a program to automatically identify a first portion of the program that is predicted as being written by a first developer wherein a remaining portion of the program is written by a second developer the method comprising:
extracting coding style information from a plurality of program elements, the coding style information identifying a pattern indicative of how one or more non-syntactic characters have been inserted among syntactic program elements of the plurality of program elements;
defining a plurality of code style templates;
generating abstract coding style representation for each of the plurality of code style templates;
mapping the non-syntactic characters to an abstract coding style representation; and
computing a coding style anomaly value as information entropy, the coding style anomaly value determined by matching the one or more program elements to abstract code representation, the coding style anomaly value indicating how rare the occurrence of a particular style of each program element is in the target source code;
wherein the coding style anomaly value is used to identify one or more program elements which are written with the first coding style as being distinctive from the second coding style.

14. The hardware product of claim 13 wherein the one or more non-syntactic characters comprise at least one of a blank, a tab, a line break, and a bracket, and wherein the one or more non-syntactic characters have been inserted among syntactic program elements of the plurality of program elements.

15. The hardware product of claim 13 further including defining a coding style template for each of a plurality of program element types defined in a syntax of a target programming language corresponding to the program, and mapping each of the program elements to a corresponding abstract coding style.

16. The hardware product of claim 15 wherein each coding style template is defined with a target syntax element type, one or more coding style placeholders, and a coding style-abstraction function.

17. The hardware product of claim 16 further comprising applying at least one template to the source code of the program to obtain one or more abstract coding styles; parsing the source code and extracting program elements; and computing an abstract coding style of each program element by applying a corresponding coding style template.

* * * * *